United States Patent [19]
Lappin et al.

[11] Patent Number: 5,875,602
[45] Date of Patent: Mar. 2, 1999

[54] CLIP FOR MITERED SIDING ACCESSORIES

[75] Inventors: Rick A. Lappin, Brooklyn; Robert Werner, Howell, both of Mich.

[73] Assignee: CertainTeed Corporation, Valley Forge, Pa.

[21] Appl. No.: 802,750

[22] Filed: Feb. 20, 1997

[51] Int. Cl.$^6$ ..................................................... E04B 1/38
[52] U.S. Cl. .......................... 52/712; 52/656.5; 52/656.6; 52/656.9; 52/716.2; 52/717.01; 52/211; 403/231; 403/401; 403/402; 24/338; 24/563; 24/545
[58] Field of Search ................................ 52/656.1, 656.2, 52/656.4, 656.5, 656.6, 656.9, 655.1, 736.2, 712, 716.2, 717.01, 302.6, 209, 211, 475.1; 403/401, 402, 403, 205, 230, 231; 24/563, 545, 338

[56] References Cited

U.S. PATENT DOCUMENTS

| | | | |
|---|---|---|---|
| 471,610 | 3/1892 | Hart | 403/403 |
| 1,867,107 | 7/1932 | Schmidt, Jr. | 403/205 |
| 2,810,173 | 10/1957 | Bearden | 24/338 X |
| 2,843,232 | 7/1958 | Goldberg | 52/656.9 X |
| 3,131,793 | 5/1964 | Bohn | 52/656.2 |
| 3,726,552 | 4/1973 | Widerby | 403/205 |
| 3,989,398 | 11/1976 | Wendt | 403/230 |
| 4,222,209 | 9/1980 | Peterson | 403/295 X |
| 4,228,630 | 10/1980 | Englert et al. | 52/656.9 |
| 4,307,976 | 12/1981 | Butler | 24/545 X |
| 4,513,554 | 4/1985 | Johnson et al. | 403/231 X |
| 4,608,800 | 9/1986 | Fredette | 52/656.1 |
| 4,651,482 | 3/1987 | Borys | 52/656.9 X |
| 4,918,893 | 4/1990 | Vandenbroucke et al. | 52/712 X |
| 5,671,580 | 9/1997 | Chou | 52/656.4 |
| 5,697,131 | 12/1997 | Hunt | 24/563 |

FOREIGN PATENT DOCUMENTS

| | | | |
|---|---|---|---|
| 807721 | 1/1959 | United Kingdom | 24/563 |

*Primary Examiner*—Carl D. Friedman
*Assistant Examiner*—Laura A. Callo
*Attorney, Agent, or Firm*—Duane, Morris & Heckscher, LLP

[57] ABSTRACT

A clip is provided for the channeling of water flow in assembled vinyl siding trim accessories, the clip having a first end segment which forms a detachable retention fastener, and a second end segment formed for the channeling of water.

18 Claims, 4 Drawing Sheets

CLIP FOR MITERED SIDING ACCESSORIES

FIELD OF THE INVENTION

This invention relates generally to vinyl siding accessories and, more particularly, to a drip clip for use with mitered siding accessories.

BACKGROUND OF THE INVENTION

Vinyl siding has become a very popular exterior finishing product primarily due to its relatively low cost and durability when compared to traditional materials such as wood or metal. In addition, vinyl siding can also be provided in a wide variety of colors and patterns, and is more flexible and forgiving, and hence, will not deform plastically under minor impact loads. Vinyl siding is also easy to machine and cut and can be worked with almost any hand tool at the construction site.

While the installation of exterior vinyl siding panels is relatively straightforward, installing vinyl siding around doors and windows requires more labor and expertise. Common finishing techniques for vinyl siding construction around doors, windows and other exterior openings typically involves the placement of trim accessories around the periphery of the door or window. While interior door and window trim is primarily aesthetic, outdoor trim requires consideration of the effects of rain, snow, wind and other natural elements.

The installation of aluminum siding requires special trim pieces or accessories to be formed and placed around these exterior openings. Typically, these trim pieces are specially designed to direct water away from these openings. As a result, during installation, these adjoining trim pieces require special preparation to avoid the infiltration of natural elements.

In the prior art, the interconnection of corner trim accessories for vinyl siding involves the construction of a "rain tab." The "rain tab" directs water flow from a longitudinal trim accessory into a vertical trim accessory that together form a mitered section. However, the preparation and construction of these "rain tabs" requires additional and costly labor by installers to create the "rain-tab" prior to installation.

Thus it would be desirable to provide a convenient and simplified means to interconnect siding accessories while still providing sufficient weather protection for the underlying structure.

SUMMARY OF THE INVENTION

The present invention provides for a clip for directing water flow around a longitudinal and a vertical member, the clip comprising a first end segment having detachable retention means, the retention means adapted for connection to the longitudinal member and a second end segment perpendicularly disposed in relation to the first end segment, the second end segment forming a water channeling surface whereby water collected in the longitudinal member is directed away from the longitudinal member and onto the vertical member.

The clip of this invention can be fabricated from a multitude of materials including metal, plastic, rubber or other synthetics.

It is the object of the present invention to provide a means for the rapid and efficient connection of siding panels and pieces.

Other objects and advantages of the present invention will become apparent after reading the detailed description of the present invention.

BRIEF DESCRIPTION OF THE DRAWINGS

The accompanying drawings illustrate preferred embodiments of the invention according to the practical application of the principles thereof, and in which.

DETAILED DESCRIPTION

The invention is now described with reference to the accompanying figures.

Figure 1:
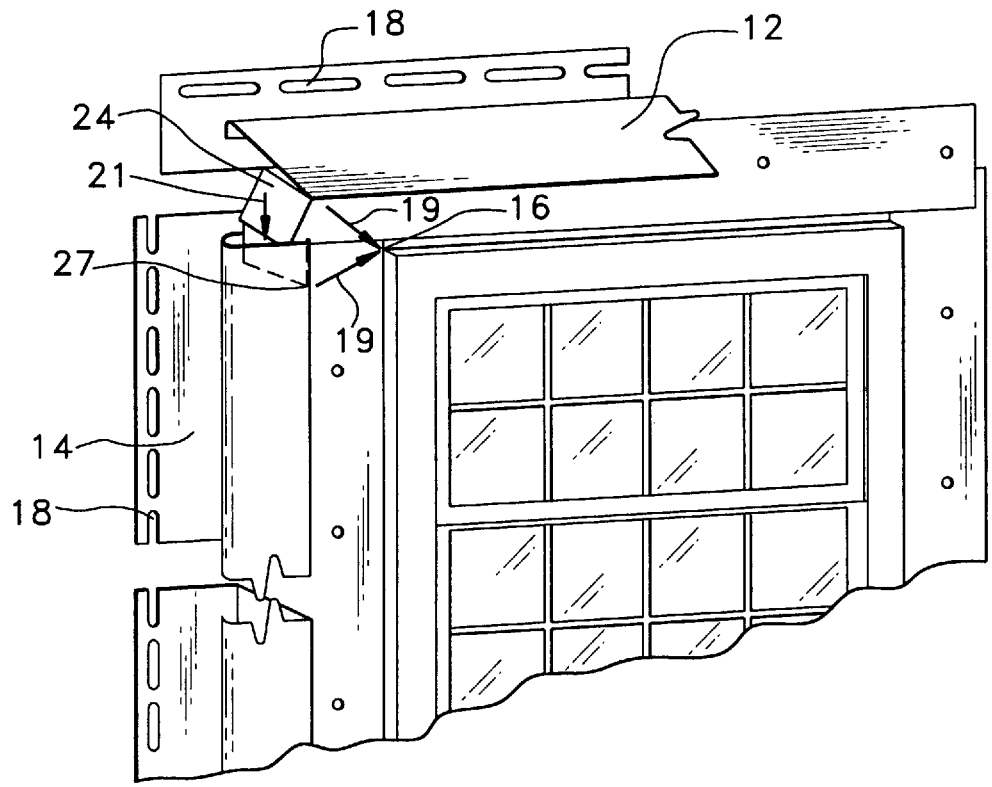
FIG. 1 is a perspective view of a prior art siding trim assembly.

FIG. 1 shows a typical prior art trim accessory installation for a window or door frame 10. The trim accessories include a horizontal J-channel member 12 and a vertical J-channel member 14. The horizontal member 12 and the vertical member 14 are displaced at right angles to one another and meet at mitered edge 25. During installation, the horizontal member 12 and the vertical member 14 meet at joint 16 and are attached to the window or door peripheral surface by nailing, stapling or other fastening means, not shown, through slots 18.

Figure 2:
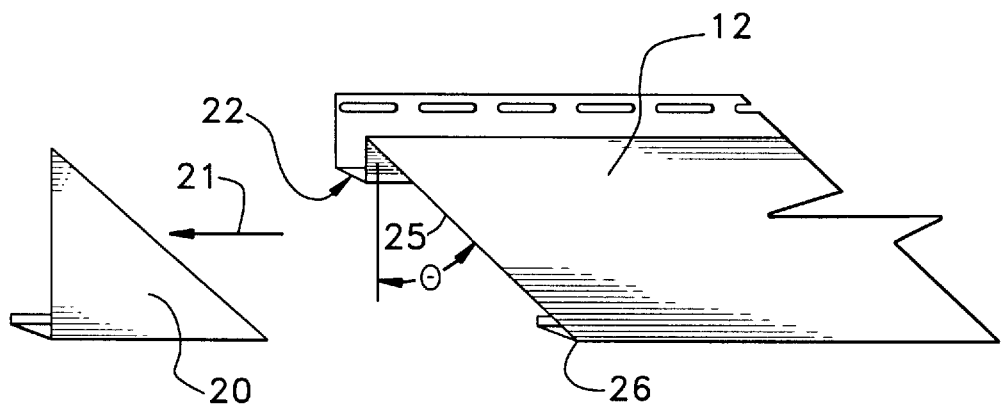
FIG. 2 is a front perspective view of a prior art horizontal channel trim piece with a mitered edge.

The preliminary preparation of the horizontal member 12 as performed in the prior art is shown in FIG. 2. As shown, the horizontal member 12 is miter cut, preferably at an angle θ of 45 degrees. After cutting, the mitered scrap piece 20 is removed as shown by arrow 21. In the prior art, special care is required during mitering in order to prevent the removal of the rain-tab portion 22, which has to be preserved for the formation of a rain-tab 24. As a result, the positioning of the rain-tab 24 at the mitered edge prohibits the use of most typical mechanized methods of cutting accessories.

Figure 3:
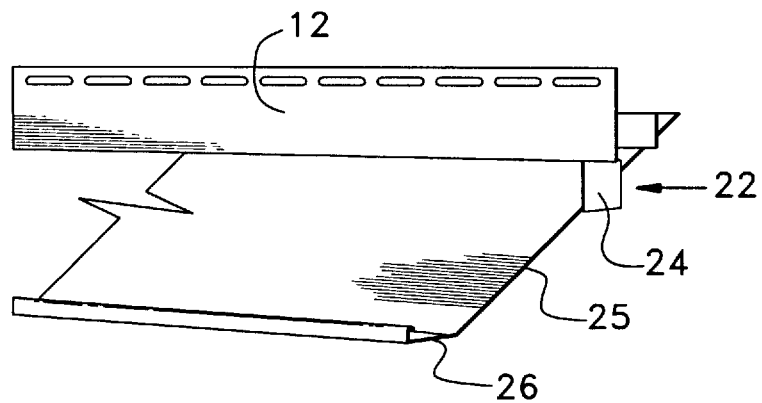
FIG. 3 is a rear perspective view of the prior art horizontal channel trim piece with formed rain tab.

As shown more clearly in FIG. 3, the rain-tab 24 is formed from the rain-tab portion 22. As constructed, the rain-tab 24 is positioned to engage the vertical J-channel member 12 and allows water collected in the pocket area 26 of the horizontal J-channel member 10 to flow down vertical J-channel member 12.

Figure 4:
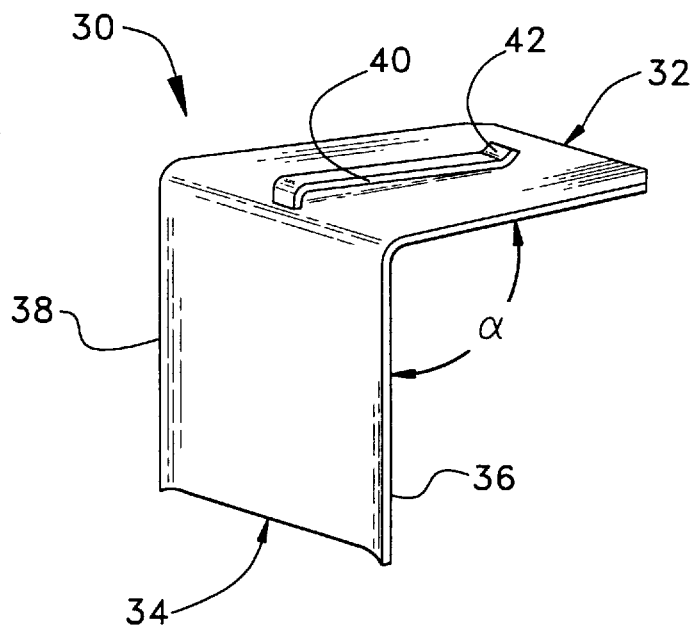
FIG. 4 is a perspective view of a clip made in accordance with the teachings of the present invention.

FIGS. 4–6 show a drip clip 30 made in accordance with the teachings of the present invention. The clip 30 is designed for replacement of the rain-tab 24. Thus, without having to form a rain-tab, any siding member can now be power mitered since the rain-tab portion of the member does not have to be preserved. By allowing a power mitering operation, the finished cut of edge 25 is more precise and preparation time is saved.

In the preferred embodiment, as more clearly shown in FIG. 4, the clip 30 is a continuous "L"-shaped strip having a first end segment 32 and a second end segment 34. The second end segment 34 is disposed at an angle γ of about 90 degrees relative to the first end segment 32. The second end segment 34 has a substantially smooth surface and forms a water channeling surface between a first edge 36 and a second edge 38.

Figure 5A:
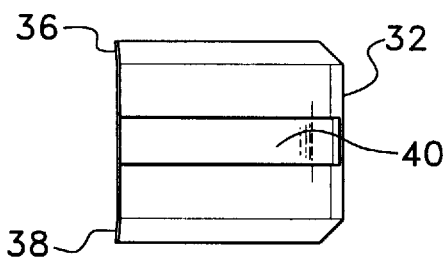
FIG. 5a is a bottom view of the clip made in accordance with the teachings of the present invention.
Figure 5B:
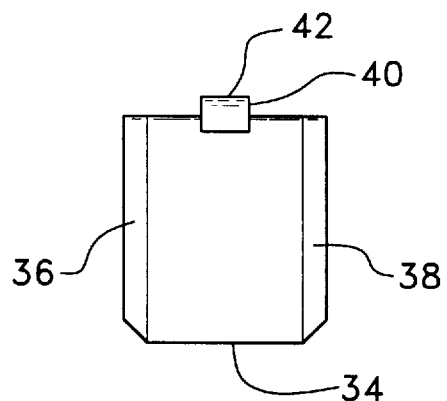
FIG. 5b is a rear view of the clip made in accordance with the teachings of the present invention.

As more clearly shown in FIGS. 5a and 5b, the first and second edges 36, 38 are beveled in order to provide a channel or funnel-like surface for water flow. Alternatively, it is contemplated that the first and second edges 36, 38 may also be flat and lie flush with the primary surface of the second end segment 34.

Figure 6A:
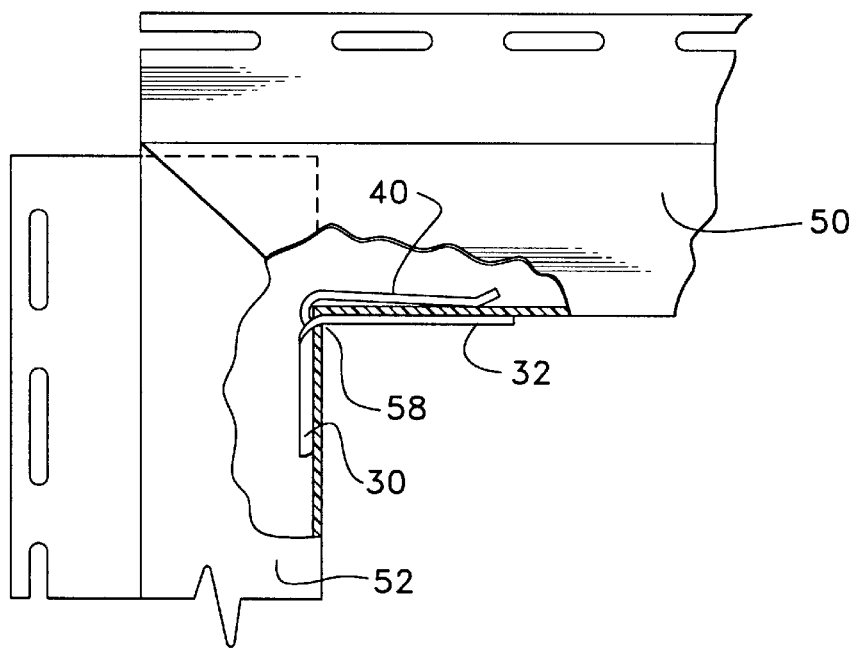
FIG. 6a is a side cut-out view of the interconnection of corner siding accessories using the clip.
Figure 6B:
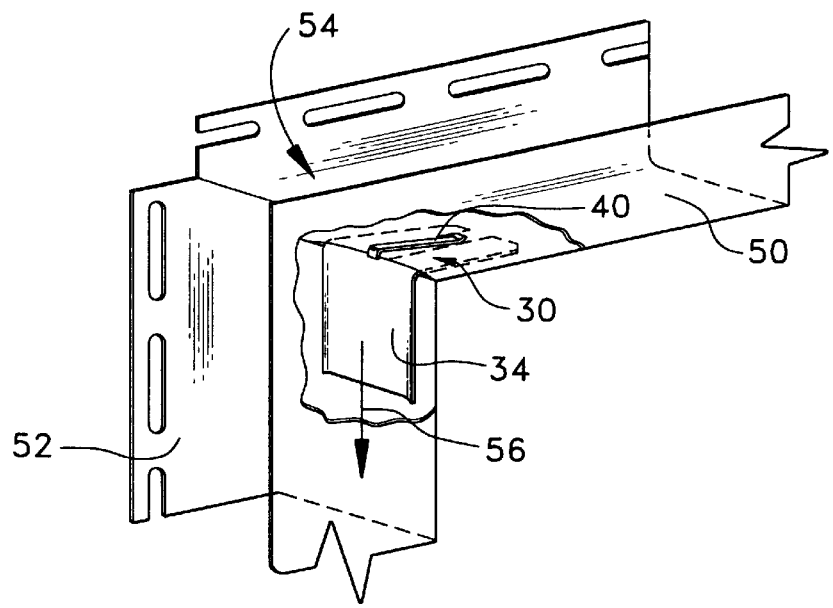
FIG. 6b is a perspective cut-out view of the interconnection of corner siding accessories using the clip.

Referring to FIGS. 6a and 6b, the clip 30 is provided with a flexible barb 40 for connection to a horizontal trim member 50. The flexible barb 40, in conjunction with the remaining surface of the first end segment 32 form a retention means which allows attachment of the clip 30 to a horizontal siding member 50. The barb 40 has a slightly upturned end 42 to facilitate attachment of the clip 30. Alternatively, the edge of the first end segment 32 may be slightly curved downwardly in complementary fashion to upturned end 42 to further aid attachment to the member 50. When attached to the member 50, the member 50 is positioned between the barb 40 and the surface of the first end segment 32. The barb 40 accordingly flexes upward and provides a sufficiently complementary force downward to prevent unwanted release of the clip 30 during normal use. However, the clip 30 is also designed to be readily detachable by the user to allow for ease of adjustment during the installation process or replacement if necessary.

When installed, the second end segment 34 of the clip 30 is positioned within and overlaps a vertical siding member 52. In operation, water from rain, melting ice, snow or other sources collects within the horizontal member 50 in the pocket designated by arrow 54. The water is then channeled from the horizontal member 50 into the second end segment 34 of the clip 30 and down the vertical member 52 in the direction of arrow 56. The path of oncoming water collected in the pocket area 54 of the horizontally mounted member 50 is not disturbed as it is channeled over the end of the miter cut horizontal member 50 and into the vertical pocket of the adjoining vertical member 52. Practically, it is essential to remove any water collected in the pocket 54 in order to preserve the integrity of the joint 58, thereby preventing damage to the underlying wooden structure.

The width of the clip 30 is dependent on the width of the members 50 and 52. Preferably, the clip 30 is approximately between ½ and ¾ of an inch wide. The width should be sufficient to provide coverage of the mated joint between connected siding members. Similarly, the length of both the first end segment 32 and second end segment 34 is between ½ and ¾ of an inch for each segment.

In construction, the clip 30 described herein can be constructed of any variety of rigid or semi-rigid materials including plastic, metal, and rubber. The clip may be stamped from spring steel or alternatively can be made from injection molded plastics such as glass or graphite filled polyethylene, polystyrene, nylon, etc. The clip 30 can also be treated with selective hydrophilic or hydrophobic coatings for directing water, as desired. The retaining barb can either be molded as an integral part of the clip or may be attached after formation of the clip. The first end segment and second end segment of the clip can be formed as a unitary strip which is then bent into the appropriate angle, preferably around 90 degrees or can be two separate pieces which are then attached by either hinging, welding, heat bonding, gluing or other attachment methods.

Figure 7:
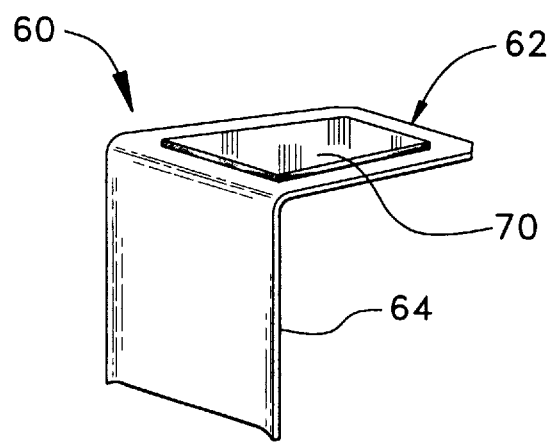
FIG. 7 is a perspective view of an alternate embodiment of the clip.

An alternate embodiment of the present invention is shown in FIG. 7. In this embodiment, the clip 60 is provided with an adhesive 70 attached to a first end segment 62 of the clip 60. The adhesive is fixedly attached on one side to the first end segment 62 of the clip 60 and is positioned for attachment to the underside of a siding trim member. During installation, the exposed side of the adhesive is pressed onto the underside of a horizontal trim member, which is then coupled to a vertical trim member. The second end segment 64 of the clip 60 is positioned within the vertical member to allow channeling of water flow. Alternatively, the adhesive used may be in the form of a hook and loop fastener material or other industrial adhesives.

While the clip disclosed herein is shown and described for attachment to a horizontal trim member coupled to a vertical trim member, the clip may be used in a vice versa manner with the clip attached to the vertical member which is then coupled to a horizontal member. In this fashion, the clip serves to stabilize the adjoining mitered corners of the vertical and horizontal members.

Persons skilled in the art may recognize other steps that can be added to the embodiment described above. Similarly, persons skilled in the art may recognize other alternatives to the steps or equations disclosed herein. However, all these additions and/or alterations are considered to be within the scope of the claims underneath.

What is claimed is:

1. A clip for use with construction finishing accessories comprising:

a first clip segment, said first clip segment having a fastener thereon, for connection to a first one of said finishing accessories; and a second clip segment adapted for placement in an overlapping arrangement with a second one of said finishing accessories, said second clip segment approximately perpendicularly disposed in relation to said first clip segment, said second clip segment having a substantially planar surface, said second clip segment including first and second beveled edges and a free third edge, said substantially planar surface and said first and second beveled edges forming a fluid channel to promote water flow.

2. The clip of claim 1, wherein said fastener comprises a flexible barb.

3. The clip of claim 1, wherein said fastener comprises an adhesive.

4. The clip of claim 1, wherein said clip is constructed of metal.

5. The clip of claim 1, wherein said clip is constructed of plastic.

6. The clip of claim 1, where said second clip segment is adapted for placement in an overlapping arrangement with a vertical finishing accessory.

7. A detachable clip for use with vinyl siding members comprising:

a continuous strip having a first and second end, said first end having a fastener thereon, adapted for connection to a first vinyl siding member, and said second end approximately perpendicularly disposed in relation to said first end, said second end having a portion adapted for placement in an overlapping arrangement with a second vinyl siding member forming a water channeling surface, said portion of said second end including first and second beveled edges and a free third edge, said portion of said second end and said first and second beveled edges forming a fluid channel to promote water flow.

8. The clip of claim 7, where said fastener comprises a flexible barb.

9. The clip of claim 8 wherein said barb is molded from said first end segment of said clip.

10. The clip of claim 7, where said fastener comprises an adhesive.

11. The clip of claim 7, where said fastener comprises a plurality of flexible barbs.

12. The clip of claim 7, wherein said clip is constructed of metal.

13. The clip of claim 7, wherein said clip is constructed of plastic.

14. The clip of claim 7, wherein the portion is adapted for placement in an overlapping arrangement with a vertical vinyl siding member.

15. A mating structure for water protection in vinyl siding accessories comprising:

a detachable clip having a first and second end segment;

said first end segment forming retention means, said retention means adapted for detachable engagement with a longitudinal vinyl siding accessory; and said second end segment perpendicularly disposed in relation to said first end segment for placement in overlapping arrangement with a vertical siding accessory, said second end segment having a substantially smooth surface to promote water flow, wherein said second end segment includes a first and second edge and a free third edge, said first and second edges being beveled.

16. The clip of claim 15, where said retention means comprises a flexible barb.

17. The clip of claim 15, where said retention means comprises an adhesive.

18. The clip of claim 15, where said retention means comprises a plurality of flexible barbs.

* * * * *